United States Patent

McLean et al.

(10) Patent No.: US 6,541,147 B1
(45) Date of Patent: Apr. 1, 2003

(54) PRINTED CIRCUIT BOARD SEPARATOR FOR AN ELECTROCHEMICAL FUEL CELL

(75) Inventors: Gerard Francis McLean, Victoria (CA); Jeremy Lindstrom, Victoria (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/720,437

(22) PCT Filed: Jul. 1, 1999

(86) PCT No.: PCT/GB99/02073

§ 371 (c)(1),
(2), (4) Date: Apr. 9, 2001

(87) PCT Pub. No.: WO00/02270

PCT Pub. Date: Jan. 13, 2000

(30) Foreign Application Priority Data

Jul. 1, 1998 (GB) ............................................. 9814123

(51) Int. Cl.[7] ................................................ H01M 2/08
(52) U.S. Cl. ............................. 429/35; 429/18; 429/32; 429/33; 429/38
(58) Field of Search .............................. 429/18, 32, 33, 429/35, 38

(56) References Cited

U.S. PATENT DOCUMENTS

| | | | | |
|---|---|---|---|---|
| 4,826,554 A | 5/1989 | McIntyre et al. | ........... | 156/280 |
| 4,988,583 A | 1/1991 | Watkins et al. | ........... | 429/30 |
| 5,108,849 A | 4/1992 | Watkins et al. | ........... | 429/30 |
| 5,252,410 A | 10/1993 | Wilkinson et al. | ........... | 429/33 |
| 5,607,785 A | 3/1997 | Tozawa et al. | ........... | 429/33 |
| 5,656,081 A | * 8/1997 | Isen et al. | ........... | 118/46 |
| 5,683,828 A | * 11/1997 | Spear et al. | ........... | 429/13 |

FOREIGN PATENT DOCUMENTS

| | | |
|---|---|---|
| DE | 38 12 813 | 6/1989 |
| EP | 0 785 588 | 7/1997 |
| FR | 2 306 540 | 3/1976 |
| GB | 9814123.7 | 7/1998 |
| JP | 60-101881 | 6/1985 |
| JP | 1-292759 | 11/1989 |
| JP | 5-314999 | 11/1993 |
| JP | 8-50903 | 2/1996 |
| JP | 8-138700 | 5/1996 |
| WO | WO 88/01310 | 2/1988 |
| WO | WO 97/08766 | 3/1997 |

OTHER PUBLICATIONS

Cleghorn et al., "A Printed Circuit Board Approach to Measuring Current Distribution in a Fuel Cell," *Journal of Applied Electrochemistry 28*, pp. 663–672, Jul., 1998.

* cited by examiner

*Primary Examiner*—Carol Chaney
(74) *Attorney, Agent, or Firm*—McAndrews, Held & Malloy, Ltd.

(57) ABSTRACT

A proton exchange membrane (PEM)-type fuel cell is formed from layered undulate MEA structures and separator plates alternating with each other in the stack dimension so that each layered MEA structure is disposed between and attached to an associated pair of separator plates so as to form at least one discrete conduit on each side of each layered MEA structure through which conduit reactant gas may be circulated. Each layered MEA structure is formed from proton exchange membrane material sandwiched between a pair of spaced-apart current collectors with electro-catalyst particles between the membrane material and each current collector so that the membrane material and electro-catalyst particles fill the space between the current collectors, forming together with the current collectors a layered MEA structure. Each separator plate is formed from a non-conductive substrate overlaid on each surface by a selected pattern of conductive paths, paths on one side of the substrate being connected by vias to paths on the other side of the substrate, the paths being attached to the current collectors of the layered MEA structures on either side of the separator plate.

15 Claims, 3 Drawing Sheets

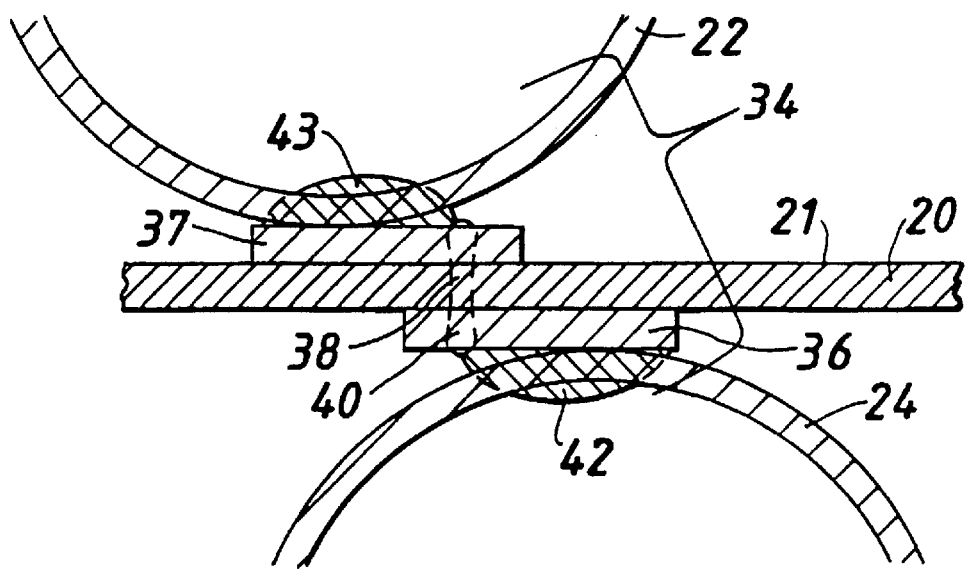
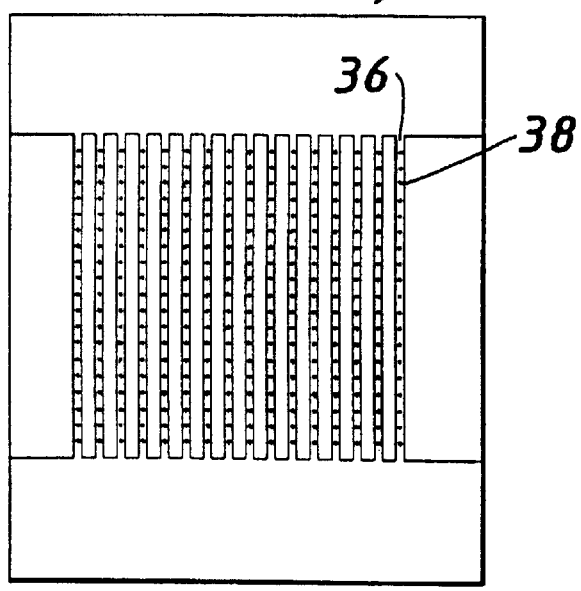
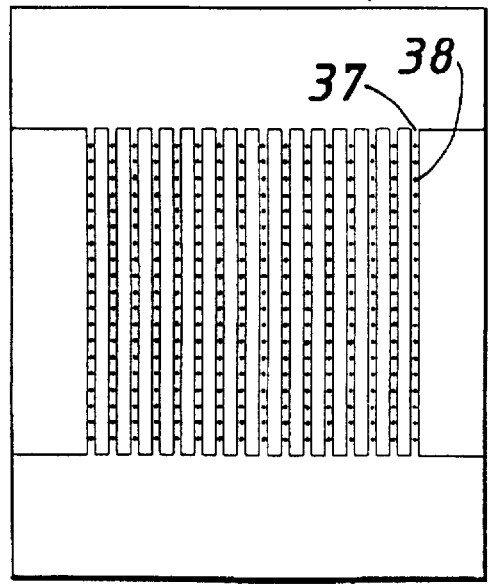

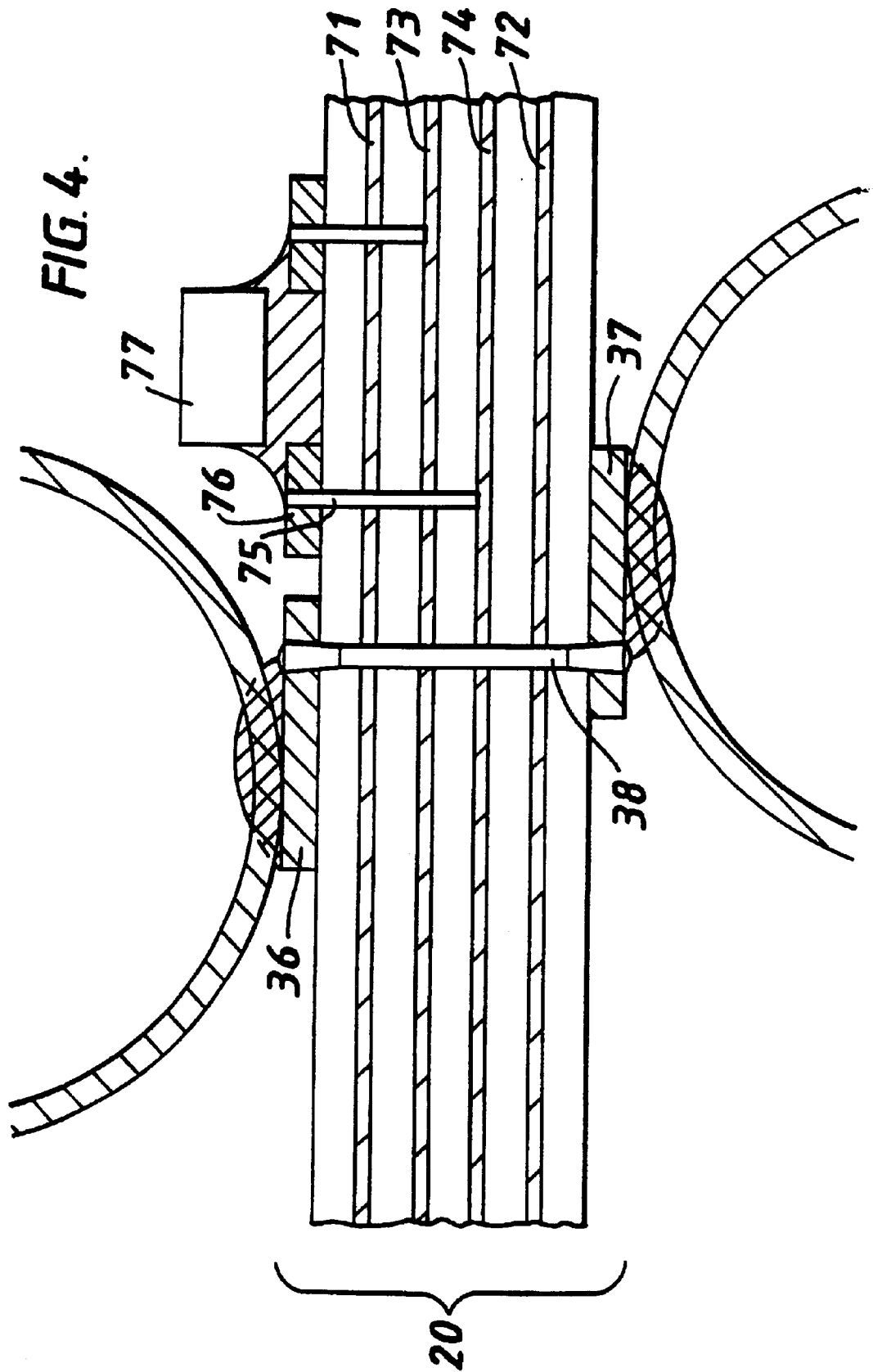

PRINTED CIRCUIT BOARD SEPARATOR FOR AN ELECTROCHEMICAL FUEL CELL

RELATED APPLICATION

This application includes subject-matter incorporated from applicant's British Patent Application Serial No. 9814123.7 filed on Jul. 1, 1998.

FIELD OF THE INVENTION

The present invention relates to electrochemical cells and particularly to fuel cells incorporating a proton exchange membrane. More particularly, the present invention relates to the use of printed circuit boards to form internal separator layers for non-planar electrolyte layered fuel cells.

BACKGROUND

Electrochemical fuel cells convert fuel and oxidant to electricity and reaction product. In electrochemical fuel cells employing hydrogen as the fuel and oxygen as the oxidant, the reaction product is water. Conventional proton exchange membrane ("PEM") fuel cells generally employ a planar, layered structure known as a membrane electrode assembly ("MEA"), comprising a solid polymer electrolyte or ion exchange membrane, which is neither electrically conductive nor porous, disposed between an anode electrode layer and a cathode electrode layer. The electrode layers are typically comprised of porous, electrically conductive sheets with elecro-catalyst particles at each membrane-electrode interface to promote the desired electrochemical reaction.

During operation of the fuel cell, hydrogen from a fuel gas stream moves from fuel channels through the porous anode electrode material and is oxidized at the anode electro-catalyst to yield electrons to the anode plate and hydrogen ions which migrate through the electrolyte membrane. At the same time, oxygen from an oxygen-containing gas stream moves from oxidant channels through the porous electrode material to combine with the hydrogen ions that have migrated through the electrolyte membrane and electrons from the cathode plate to form water. A useful current of electrons travels from the anode plate through an external circuit to the cathode plate to provide electrons for the reaction occurring at the cathode electro-catalyst.

In conventional fuel cells, the MEA is interposed between two rigid, planar, substantially fluid-impermeable, electrically conductive plates, commonly referred to as separator plates. The plate in contact with the anode electrode layer is referred to as the anode plate and the plate in contact with the cathode electrode layer is referred to as the cathode plate. The separator plates (1) serve as current collectors, (2) provide structural support for the MEA, and (3) typically provide reactant channels for directing the fuel and oxidant to the anode and cathode electrode layers, respectively, and for removing products, such as water, formed during operation of the fuel cell. Fuel channels and oxidant channels are typically formed in the separator plates; the plates are then normally referred to as fluid flow field plates. Herein, "fluid" shall include both gases and liquids; although the reactants are typically gaseous, the products may be liquids or liquid droplets as well as gases.

Multiple unitary fuel cells can be stacked together to form a conventional fuel cell stack to increase the overall power output. Stacking is typically accomplished by the use of electrically conductive bipolar plates which act both as the anode separator plate of one fuel cell and as the cathode separator plate of the next fuel cell in the stack. One side of the bipolar plate acts as an anode separator plate for one fuel cell, while the other side of the bipolar plate acts as a cathode separator plate for the next fuel cell in the stack. The bipolar plates combine the functions of anode and cathode plates referred to above and are provided with the fuel channels and oxidant channels. The internal structure of fuel cell stacks based on planar MEA elements requires complex bi-polar separator plates in which the fluid flow channels have been formed by removing material from the plate, usually through some form of machining process.

Watkins, U.S. Pat. Nos. 4,988,583 and 5,108,849, issued Jan. 29, 1991 and Apr. 28, 1992, respectively, describe fluid flow field plates in which continuous open-faced fluid flow channels formed in the surface of the plate traverse the central area of the plate surface in a plurality of passes, that is, in a serpentine manner, between an inlet manifold opening and an outlet manifold opening formed in the plate. These patents are typical of conventional fuel cell designs.

Undulate electrolyte layer fuel cells have also been proposed in high temperature, molten carbonate type fuel cells. For example, BBC Brown Boveri (FR 2306540) proposes a non-planar electrolyte layered molten carbonate fuel cell, and German Patent DE 3812813 proposes the use of a non-planar glass electrolyte layer. Japanese patent 1-292759 takes the non-planar electrolyte molten carbonate fuel cell concept one step further, proposing a different means of obtaining the non-planar structure. These molten carbonate cells are based entirely upon the use of planar separator layers and rely exclusively upon the use of metals and high temperature bonding techniques for cell construction. Construction of a PEM cell is impossible using the concepts disclosed in these patents.

McIntyre, U.S. Pat. No. 4,826,554, issued May 2, 1989, discloses a sinuously-formed "electrically conductive, hydraulically permeable matrix 130, which is also embedded into the membrane sheet 120". However, there is no disclosure of alternating layers in a stack that contact one another to form interior flow conduits or channels.

Japanese Patent Publication No. 50903/1996, Futoshi et al., Feb. 20, 1996, discloses a solid polymer fuel cell having generally planar separators with alternating protruding parts serving to clamp a power generation element (apparently an MEA) into a non-planar but piecewise linear shape. The area of the MEA exposed to reactants is increased relative to planar MEA designs, but the portions of the MEA clamped between the protruding parts and the planar portion of each separator do not appear to be exposed to reactants. Further, significant clamping force appears to be required to reduce contact resistance. Such force, together with the abrupt changes in direction at the corners of the protruding parts, may introduce kinks and very large stresses in the MEA.

Separators that have been disclosed in the prior art are typically composed of flat sheets of simply conductive material such as metal or in some cases graphite.

British application Serial No. 9814123.7 (McLean et al., assigned to the applicant herein) filed on Jul. 1, 1998 and derivatives and divisionals thereof provide details of different aspects of non-planar MEA layers in PEM fuel cells, and other aspects of PEM fuel cell design.

SUMMARY OF THE INVENTION

In accordance with the present invention, a fuel cell stack comprises a stacked series of MEA structures alternating with aligned separator plates, each MEA structure being non-planar and having sufficient rigidity to retain its shape when the stack is placed under sufficient pressure in the stacking direction to maintain physical and electrical contact between each MEA structure and the adjacent separator plate and forming ,thereby, the fuel and oxidant channels between the MEA structure and the separator plates, each separator plate comprising an electrically insulating substrate overlaid on each surface by a selected pattern of electrically conductive traces, each trace on one surface of the substrate electrically connected to at least one trace on the opposite surface of the substrate by a conductive path, and the pattern of the traces selected so that the traces on each surface of the substrate are in electrical contact with the adjacent MEA structure in the fuel cell stack when the separator plate is aligned with the adjacent MEA structures and stacked in the fuel cell stack.

By employing non-planar MEA separator layers it becomes possible to build up a complex flow-field fuel cell stack by forming sheet elements into three dimensional structures based on periodic undulating waveforms. The resulting fuel cell stack can be manufactured in a continuous process with virtually no waste material. The resulting stack also has higher power density than its conventional counterpart since the MEA layer is undulate and therefore covers a larger surface area in the same volume and since layers can be stacked together more tightly than in the planar MEA case through the use of undulate separators in addition to the undulate MEA layers.

By forming the fuel and oxidant channels by the separation of the non-planar MEA structure from the separator plates a greater portion of the MEA structure is exposed to the fuel and oxidant fluids as compared to prior structures where the channels are formed by the separation of a non-planar separator plate from a planar MEA structure.

In accordance with our invention, which incorporates a non-planar electrolyte layer, the required separator function is provided by a composite separator plate of a non-conducting material with conductive traces formed on its surface by printed circuit processes which may be incorporated in non-planar MEA layer fuel cell stacks employing either planar or non-planar separator layers.

The use of printed circuit board technology in the manufacture of separator strata is advantageous because it is possible to create traces onto which the screens can be soldered that are very narrow transversely. Narrow traces minimize the amount of exposed metal as the traces are metallic; exposed metal can shorten cell lifetimes in two ways. First, the metal itself may corrode, which can cause premature failure of the structure. Second, metal ions may be deposited into the catalyst layer, causing catalyst sites to become "clogged" with metal ions and ultimately "choking" the cell.

Further, narrow traces allow for simple alignment of the screens in the manufacturing stage by the use of the surface tension of molten solder to draw the screens into alignment when the screens are soldered in place by re-flow soldering a process commonly used in the assembly of surface mount components on printed circuit boards.

It is also an aspect of the invention to use hydrogen in a fuel cell stack made up of fuel cells having separator plates as heretofore described and connectable via an anode terminal and a cathode terminal to an external load. Each fuel cell has an MEA layer and two discrete associated reactant-gas impermeable separator layers. The MEA layer has a porous anode electrode, a porous cathode electrode, an electrolytic membrane layer disposed between the two electrodes, an anode electro-catalyst layer disposed between the electrolytic membrane layer and the anode electrode, and a cathode electro-catalyst layer disposed between the electrolytic membrane layer and the cathode electrode. One side of one separator layer in conjunction with the MEA layer provides at least one flowpath of a flow field for hydrogen and one side of the other separator layer in conjunction with the MEA layer provides at least one flowpath of a flow field for a selected oxidant. The flowpaths are constituted over their greater length by parallel transversely spaced and longitudinally extending flow channels interconnected in the vicinity of their ends to form the flowpaths. The MEA layer is installed in the stack between the associated separator layers so that the side of the separator layer that in conjunction with the MEA layer provides flow channels of a flow field for hydrogen faces and is in contact with the anode side of the MEA layer, whilst the side of the separator layer providing flow channels of a flow field for oxidant faces and is in contact with the cathode side of the MEA layer, so that the hydrogen flow channels are closed to form a conduit for supplying hydrogen to the MEA layer and the oxidant flow channels are closed to form a conduit for supplying oxidant to the MEA layer.

The fuel cells are stacked in sequence, the anode electrode of the fuel cell at one extremity of the stack being electrically connected to the anode terminal, the cathode electrode of the fuel cell at the other extremity of the stack being electrically connected to the cathode terminal, and the anode electrode of each of the other fuel cells in the stack being electrically connected to the cathode electrode of the next adjacent fuel cell. When the anode terminal and cathode terminal are electrically connected through an external load and for each fuel cell hydrogen is supplied to the hydrogen conduit and oxygen is supplied to the oxidant conduit, then in each fuel cell hydrogen moves from the hydrogen flow field through the anode electrode and is ionized at the anode electro-catalyst layer to yield electrons and hydrogen ions, the hydrogen ions migrate through the electrolytic membrane layer to react with oxygen that has moved from the oxidant flow field through the cathode to the cathode electro-catalyst layer and with electrons that have moved from the anode electrode electrically connected to the cathode electrode, thereby to form water as a reaction product, and a useful current of electrons is thereby produced through the load.

BRIEF DESCRIPTION OF THE DRAWINGS

FIG. 2 is a fragmentary schematic cross-sectional view of a portion of a fuel cell stack generally similar to that illustrated in FIG. 1 illustrating an embodiment of the present invention.

FIGS. 3A and 3B are respectively schematic plan views of the two sides of a planar separator using a printed circuit board that is an embodiment of the present invention.

FIG. 4 is a fragmentary schematic cross-sectional view of a portion of a fuel cell stack showing a profile of a further embodiment of the invention.

DETAILED DESCRIPTION OF THE INVENTION

Figure 1:
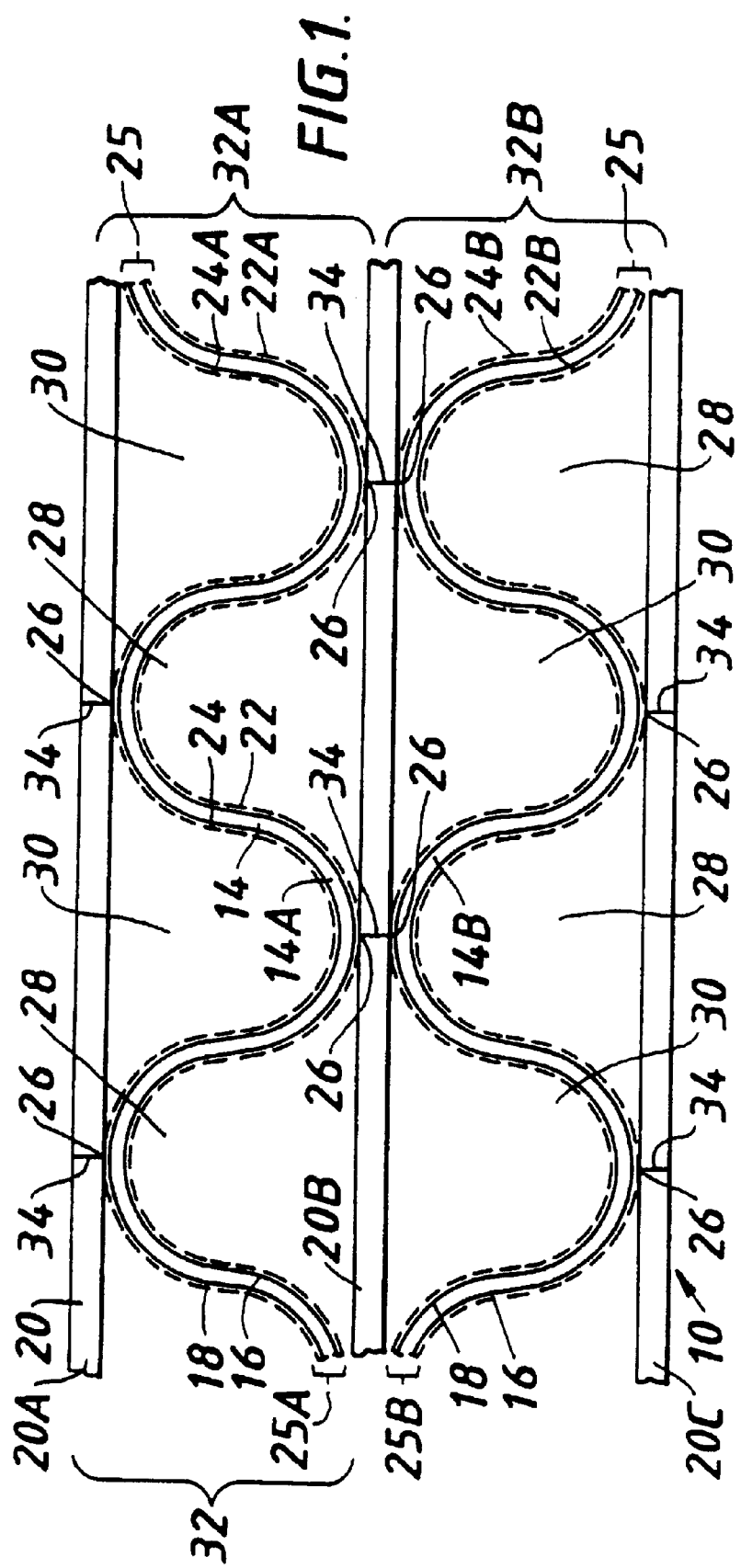
FIG. 1 is a schematic cross-sectional view of a portion of a undulate MEA fuel cell stack, taken transversely across the stack, perpendicular to the direction of reactant flow.

Separator plates in an MEA fuel cell stack separate flowing oxidant on the cathode side of one MEA from flowing fuel on the anode side of the next MEA in the stack and provide electrical connection between the cathode side of one MEA and the anode side of the next MEA in the stack. The present application describes separator plates formed from printed circuit board material that are especially useful for undulate MEA fuel cell stacks.

The overall structure of one type of fuel cell stack in which an embodiment of the present invention may be used to advantage is illustrated in FIG. 1, which provides a schematic axial cross-sectional fragmentary view of a portion of a fuel cell stack, generally indicated by reference numeral 10. The stack 10 comprises a plurality of undulate reactant gas-impermeable layered MEA structures, generally referred to by reference numeral 25 in the following discussion, and a plurality of reactant gas-impermeable conductive separator plates, generally referred to by reference numeral 20 in the following discussion. The layered MEA structures 2 and separator plates 20 are alternately disposed in the stack 10 so that each layered MEA structure 25 is disposed between an associated pair of separator plates 20. Where necessary for clarity of exposition separator plates 20 and layered MEA structures 25 are individually indicated in the drawings by reference numerals with appended letters.

The separator plates 20 and the layered MEA structures 25 extend in the axial dimension (perpendicular to the plane of FIG. 1), maintaining generally throughout such extension the cross-sectional configuration shown in FIG. 1 although the cross section may change at the ends for the purpose of manifolding for example. As the separator plates 20 and the layered MEA structures 25 are each impermeable to reactant gases, parallel oxidant conduits 28 and fuel conduits 30, whose axial or reactant flow dimension is perpendicular to the plane of FIG. 1, are formed through which the respective reactant gases may be circulated.

Some of the internal structures of the layered MEA structure 25 have been omitted in FIG. 1; alternative such structures 25 are described in British application Serial No. 9814123.7 (McLean et al., assigned to the applicant herein) filed on Jul. 1, 1998 and derivatives and divisionals thereof. Two elements common to each alternative structure 25 are reactant gas-impermeable ion-exchange membranes 14 and reactant gas-permeable conductive current collectors such as thin undulate screens 22, 24. Each membrane 14 has a cathode side or surface 16 and an anode side or surface 18 and is constrained in an undulate shape by the screens 22, 24. Each of the screens 22, 24 may, if necessary, be attached at contact points 26 to a unique one of the pair of separator plates 20 between which the membrane 14 is disposed. If the layered MEA structures 25 are sufficiently rigid to retain their shape when the stack is placed under sufficient pressure in the stacking direction to maintain physical and electrical contact at the contact points 26 between each layered MEA structure 25 and the adjacent separator plate 20, then attachment is optional.

As is the case with the separator plates 20 and the layered MEA structure 25, the membranes 14 and screens 22, 24 extend in the axial dimension, maintaining throughout such extension the cross-sectional configuration and relative attachment position shown in FIG. 1 except as mentioned above with respect to the end sections. Where necessary for clarity of exposition, the membranes 14 and the screens 22, 24 are individually indicated in the drawings by reference numerals with appended letters. For example, in FIG. 1, membrane 14A is disposed between screen 24A, which may be attached to separator plate 20A, and screen 22A, which may be attached to separator plate 20B. Here the exemplary separator plates 20 are planar. In the following discussion, the current collectors are generally referred to as "screens" by way of example and for convenience of exposition, but it should be understood that other reactant gas-permeable structures may be used as well.

The screens 22, 24 are treated as part of the layered MEA structure 25 for the purposes of description of the fuel cell stack 10 herein, but where it is necessary to attach the layered MEA structures 25 to the separator plates 20, the inventors have found that it is advantageous to assemble the fuel cell stack 10 by first constructing a plurality of cell skeletons, as described in British application Serial No. 9814123.7 (McLean et al., assigned to the applicant herein) filed on Jul. 1, 1998 and derivatives and divisionals thereof, each cell skeleton comprising a separator plate 20 and two attached screens 22, 24, and then either inserting layers of conventional MEA material between the cell skeletons or forming the MEAs in-situ also as described in British application Serial No. 9814123.7 (McLean et al., assigned to the applicant herein) filed on Jul. 1, 1998 and derivatives and divisionals thereof.

The screens 22, 24 can be made of expanded metal mesh, preferably made of 316L stainless steel. Other materials may also be used, such as carbon cloth or woven metal screen for the screens 22, 24. Structurally similar materials that are non-conductive may also be used for the interior of screens 22, 24 so long as they remain permeable to reactant gases when made conductive through the application of an exterior conductive surface coating by metal plating, carbon coating, or the application of conducting polymers. The sheet material out of which the screens 22, 24 are formed can be made into an undulate layer of the desired wavelength and amplitude by stamping, rolling or pressing.

The separator plate 20 of such undulate layered fuel cell configurations serves three primary functions:

1. It provides a means of attachment for the screens 22, 24 in order to constrain the shape of the undulate layers and retain this shape. This constraint is typically achieved by mechanically attaching screens 22,24 to separator 20.
2. It provides a conductive path between neighbouring cells in a fuel cell stack in order to create a series electrical connection of cells within the
3. It provides isolation between the flows of fuel and oxidant gas streams feeding the anode and cathode of the fuel cell layers on either side of the separator 20.

While previously separator plates have typically been fabricated from a uniform sheet of conductive material, the present invention utilizes a composite separator fabricated using printed circuit board techniques.

In one preferred design for cell skeleton 12 using printed circuit board for the separator plate 20, the substrate 21 of the printed circuit board separator plate 20 illustrated in FIG. 2 is made of rigid fibreglass, resin, or of flexible plastics materials such as TEFLON™ or MYLAR™. Electric circuit traces are formed on the surface of the substrate 21 using standard methodology and practice for the construction of printed circuit boards, a "trace" constituting a thin, usually metallic conductor of sufficiently low resistance to carry whatever current is required. As illustrated in FIG. 2, the circuit traces 36, 37 on each surface of the substrate 21 are electrically connected with each other through a conductively filled hole "via") 38, which is first drilled and then plated and filled with conductive material 40. The construction of such vias within printed circuit boards is common or the purpose of providing electrical communication between different circuit layers within the board. In this case the conductive vias 38 are used to facilitate the series connection of multiple fuel cells in an layered fuel cell stack.

If necessary, as shown in FIG. 2, the undulate screens 22, 24 are soldered to the circuit traces 36, 37 on either side of the substrate 21, the trace 36 providing the required electrically conductive path from screen 24 through the conductive material 40 in the via 38 to the trace 37 to the other screen 22. Reference numerals 42 and 43 in FIG. 2 indicate solder joints providing physical and electrical connection of the screens 22 to circuit traces 36 and 37, respectively.

The use of printed circuit board techniques also allows the designer the freedom to vary the relative phase of the screens 22, 24, because the screens 22, 24 can be attached to the substrate 21 from one side at a time. The portions of the traces 36, 37 to which the screens 22, 24 are attached need not be at directly opposed locations on the sides of the substrate 21, with interposed printed circuit connections as required. An example of the foregoing possibility appears in FIG. 2.

Traces 36, 37 may be used to connect screens 22, 24 that have an arbitrary phase relationship with each other. For example, in FIG. 2, the screens 22 and 24 are shown as not quite completely out of phase. This method of construction can be applied to screens 22, 24 that are in phase (by making use of relatively wide traces 36, 37 extending transversely about one-half the transverse distance of a half-wave of the undulate pattern) as well as to the embodiment illustrated in FIG. 1 in which the screens 22, 24 are completely out of phase, thus requiring the shortest traces 36, 37.

The traces 36, 37 extend axially along the lines formed by the contact points 26 and may also extend transversely at the discretion of the designer. For example, the traces 36, 37 may extend transversely so that when viewed from above the pattern of traces 36, 37 on the separator stratum 20 resembles a square lattice.

A pair of circuit board schematics for a typical circuit board based separator according to this invention are shown in FIGS. 3A and 3B. FIG. 3A shows a top view of separator 20 and FIG. 3B shows the same separator from the bottom. FIG. 3A shows multiple traces 36 providing a pad onto which the screen 22 can be attached, connecting to vias 38 in order to provide an electrically conductive path to the other side of the board. FIG. 3B shows vias 38 connecting to traces 37 which provide pads onto which screen 24 can be attached. A multiplicity of vias are provided since the current carrying capacity of each is usually limited and they must be operated in parallel. Note that since traces 36, 37 extend along the length of the separator plate the attached screens will be sealed against flow short circuiting. The overall design of the circuit board separator is accomplished using a double sided circuit board.

While the drawings in FIGS. 2 and 3 suggest the use of relatively thick, rigid circuit board material there is no imitation on the use of other substrates onto which the circuits 36, 37 and vias 38 are formed. In particular, the use of flexible materials such as MYLAR™ substrates will allow the separator 20 to be formed during manufacture into an undulate shape. Such undulate separators allow the further compaction of cell heights to increase power density of the resulting fuel cell stack. Furthermore, the use of flexible MYLAR™ type circuit boards will minimize the thickness and weight of the separator layer 20, both effects are desirable in the construction of such separators.

The preceding discussion of the use of printed circuit boards as the separator strata extends beyond the use of metallic current collectors and solder-based assembly. For instance, if non-metallic but conductive current collectors are used then the same circuit board with formed vias can be used as the separator with either stitching, stapling, riveting or otherwise mechanically fastening through the vias to provide the required mechanical assembly. In the case of a non-soldered assembly a sealing material must be applied after skeleton assembly to guarantee the required gas impermeability of the resulting separator layer. In the case of soldered assembly no such sealing layer is required, although it may still be beneficial to coat the soldered joints with a protective coating to render the metal inert in the fuel cell environment.

A further benefit of using printed-circuit-board technology arises from the possibility of embedding electronic components within the fuel cell stack 10 providing the function of monitoring internal aspects of cell operation and controlling the cell on a flow channel by flow channel basis. By using multi-layer circuit-board technology it is possible to embed complex electrical circuits in the interior of the separator 20 that do not interfere with the primary functions of the separator as outlined above. Multi-layer circuit board fabrication is an established technology for which efficient design and manufacturing processes exist. Surface mount electronic components are common, providing the means to perform monitoring and control functions within individual flow channels without the requirement for manual assembly or for puncturing the separator plate 20.

A further embodiment of the invention providing embedded monitoring of temperature and humidity within flow channels is shown in FIG. 4. FIG. 4 shows a cross sectional schematic view of a separator 20 which in this case is formed from a 6 layer circuit board. Current collector traces 36, 37 and vias 38 provide the necessary series connection between the two surfaces of the separator 20. In addition, however, internally formed planes 71,72 provide transducer excitation and ground respectively. Planes 73, 74 allow for complex circuits to be created within the interior of the separator. Vias 75 provide the means of connecting these interior planes to the surface so that surface mounted transducers 77, such as solid state thermometers or humidity monitors can be mounted on the surface of separator 20 and provide sensor measurements to a convenient location outside of the separator. In the construction of such a separator it is important to note that vias 38 must be electrically isolated from internal layers 71, 72, 73, 74. Also, vias 75 must be electrically isolated from current collecting traces 36, 37. The design of multi-layer circuit boards to satisfy constraints such as these is common and known to anyone skilled in the art of circuit board layout.

The function of active components 77 embedded within the fuel cell need not be limited only to monitoring. For instance, it would be possible to insert control valves, such as ball valves or butterfly valves, controlled by active mechanisms mounted onto the separator 20 and controlled by an external computer. Such active components, when combined with internal monitoring, provides the opportunity to control cell operation on a flow channel by flow channel basis, possibly optimizing performance and providing fine tuning capability during operation.

It is preferable to gold- or platinum-plate the metallic components of the completed cell skeleton 12 after attachment of the screens 22, 24 to the separator stratum 20 to reduce the risk of corrosion. Alternatively, a thin layer of conductive polymer material, such as polyaniline, may be applied to the metallic components of the completed cell skeleton 12 to provide a corrosion-resistant protective layer.

The use of printed circuit separator layers provides a means of manufacturing separators using established and cost effective high volume circuit board manufacturing methods. The use of circuit boards minimizes the amount of metal required in a cell, and provides a ready means of isolating any required metallic bonding components from the MEA regions.

Hydrogen may be used as a fuel gas in a fuel cell stack incorporating separator plates 20 described above. In FIG. 1 a portion of an exemplary fuel cell stack 10 is shown as made up of fuel cells 32A and 32B and includes separator plates 20A, 20B, and 20C as heretofore described. Stack 10 is connectable via a cathode terminal (not shown) and an anode terminal (not shown) to an external load (not shown). Using as an example the fuel cell indicated by reference numeral 32A, each fuel cell has a discrete MEA layer 25A and is associated with two of the reactant-gas impermeable separator layers 20A, 20B. Each MEA layer 25A has a porous anode electrode 18, a porous cathode electrode 16, an electrolytic membrane layer 14 disposed between the two electrodes, an anode electro-catalyst layer (not shown) disposed between the electrolytic membrane layer 14 and the anode electrode 18, and a cathode electro-catalyst layer (not shown) disposed between the elecrolytic membrane layer 14 and the cathode electrode 16. One side of one associated separator layer 20A in conjunction with the MEA layer 25A provides at least one flowpath of a flow field for hydrogen and one side of the other associated separator layer 20B in conjunction with the MEA layer 25A provides at least one flowpath of a flow field for a selected oxidant. The flowpaths are constituted over their greater length by parallel transversely spaced and longitudinally extending flow channels interconnected in the vicinity of their ends to form the flowpaths.

Each MEA layer 25A, 25B is installed in the stack between the associated separator layers 20A, 20B, 20C so that the side of the separator layer that in conjunction with the MEA layer provides flow channels of a low field for hydrogen faces and is in contact with the anode side of the MEA layer 25A, 25B, whilst the side of the separator layer providing flow channels of a flow field for oxidant faces and is in contact with the cathode side of the MEA layer 25A, 25B, so that the hydrogen flow channels are closed to form a conduit for supplying hydrogen to the MEA layer 25A, 25B and the oxidant flow channels are interconnected in the manner described above to form a conduit for supplying oxidant to the MEA layer 25A, 25B. For example, in the fuel cell having reference numeral 32A, the oxidant flow channels are indicated by reference numeral 28 and the hydrogen flow channels by reference numeral 30.

The fuel cells 32A, 32B are stacked in sequence and the anode electrode 18 of the fuel cell, say 32A, at one extremity of the stack electrically connected to the anode terminal, the cathode electrode 16 of the fuel cell 32B at the other extremity of the stack 10 electrically connected to the cathode terminal, and the anode electrode of each of the other fuel cells in the stack electrically connected to the cathode electrode of the next adjacent fuel cell. When the anode terminal and cathode terminal are electrically connected through an external load and for each fuel cell hydrogen is supplied to the hydrogen conduit and oxygen is supplied to the oxidant conduit, then in each fuel cell hydrogen moves from the hydrogen flow field through the anode electrode and is ionized at the anode electro-catalyst layer to yield electrons and hydrogen ions, the hydrogen ions migrate through the electrolytic membrane layer to react with oxygen that has moved from the oxidant flow field through the cathode to the cathode electro-catalyst layer and with electrons that have moved from the anode electrode electrically connected to the cathode electrode, thereby to form water as a reaction product, and a useful current of electrons is thereby produced through the load.

While particular elements, embodiments and applications of the present invention have been shown and described, it will be understood, of course, that the invention is not limited thereto, since modifications may be made by those skilled in the applicable technologies, particularly in light of the foregoing description. The appended claims include within their ambit such modifications and variants of the exemplary embodiments of the invention described herein as would be apparent to those skilled in the applicable technologies.

What is claimed is:

1. For use in a fuel cell stack including a stacked series of MEA structures alternating with aligned separator plates, each MEA structure being non-planar and having sufficient rigidity to retain its shape when the stack is placed under sufficient pressure in the stacking direction to maintain physical and electrical contact between each MEA structure and the adjacent separator plate and forming thereby fuel and oxidant channels between the MEA structure and the separator plate;

a separator plate characterized in that such separator plate comprises an electrically insulating substrate overlaid on each of its outer surfaces by a selected pattern of electrically conductive traces, each trace on one surface of the substrate electrically connected to at least one trace on the opposite surface of the substrate by a conductive path, and the pattern of the traces selected so that the traces on each surface of the substrate are in electrical contact with the adjacent MEA structure in the fuel cell stack when the separator plate is aligned with the adjacent MEA structures and stacked in the fuel cell stack.

2. The separator plate defined in claim 1, wherein the conductive path includes at least one via.

3. The separator plate of claim 1, wherein the traces are metallic.

4. The separator plate of claim 3, wherein all metallic surfaces are covered with an inert coating.

5. The separator plate of claim 1, wherein the MEA structures are mechanically connected to said conductive traces.

6. The separator plate of claim 1, wherein said traces are formed on and constitute part of a printed circuit board.

7. The separator plate as claimed in claim 6 wherein said separator plate comprises a pair of outer printed circuit boards bearing traces on their outer surfaces and at least one inner circuit board sandwiched between said outer printed circuit boards.

8. The separator plate as claimed in claim 7 wherein conductors on said inner circuit board are connected by vias to at least one electrical device located on at least one of said outer printed circuit boards.

9. The separator plate as claimed in claim 8 wherein said device is electro-mechanical.

10. The separator plate as claimed in claim 8 wherein said device is an ambient condition sensor.

11. The separator plate as claimed in any one of claims 7 to 10 wherein the inner circuit board includes an electrical device connected by vias to conductors on at least one of the outer printed circuit boards.

12. The separator plate of claim 5, wherein the said MEA structure is soldered to the said traces.

13. The separator plate of claim 1, wherein said substrate is non-planar.

14. The separator plate of claim 1, wherein said substrate is flexible.

15. The separator plate of claim 1, wherein the substrate is undulate.

* * * * *